June 11, 1929. E. J. PRIME 1,716,564
SPRING SUPPORT FOR VEHICLE BODIES
Filed Dec. 12, 1927
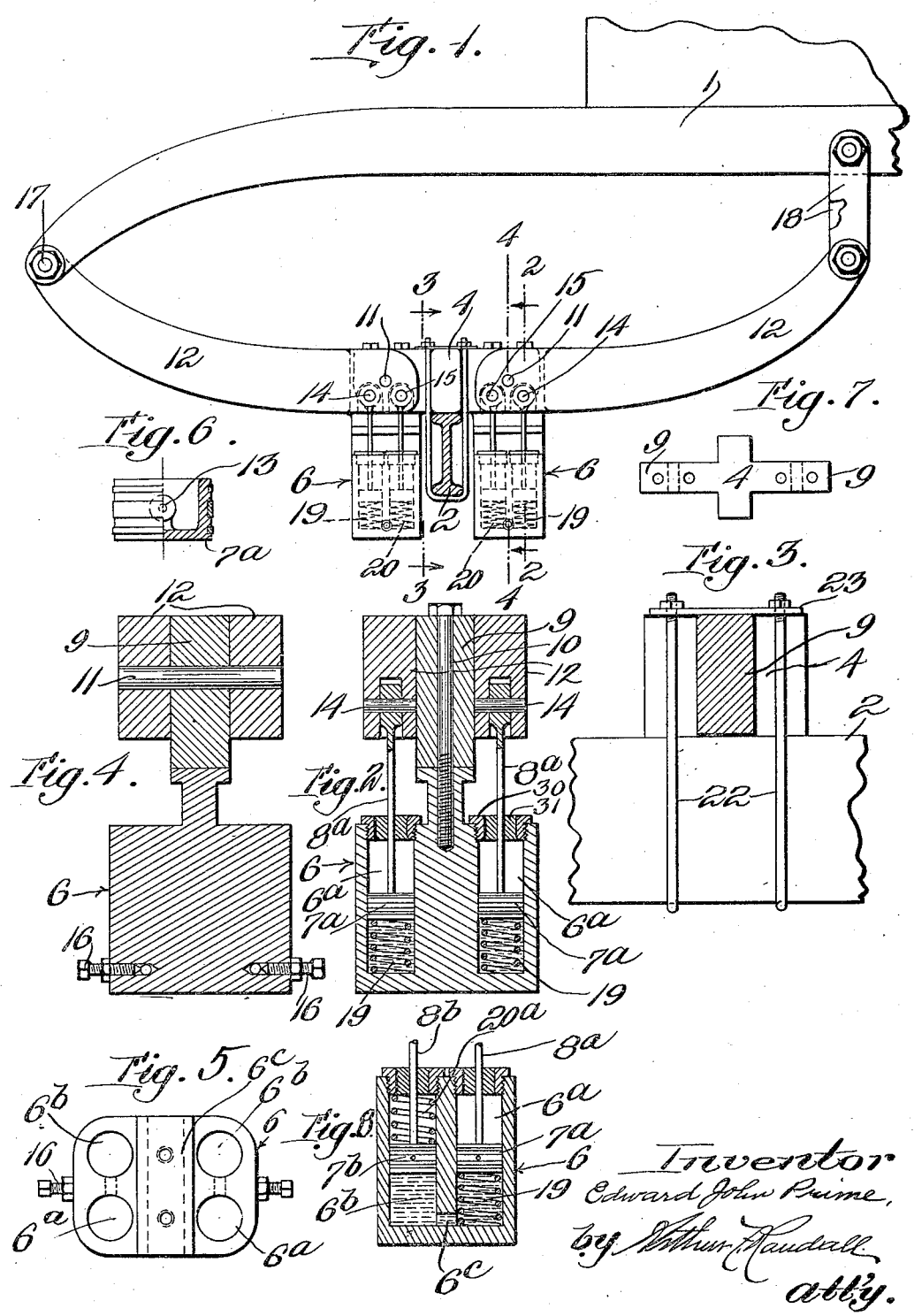

Patented June 11, 1929.

1,716,564

UNITED STATES PATENT OFFICE.

EDWARD JOHN PRIME, OF GROVELAND, MASSACHUSETTS.

SPRING SUPPORT FOR VEHICLE BODIES.

Application filed December 12, 1927. Serial No. 239,344.

My invention relates to spring supports for vehicle bodies and it has for its object to provide an improved mechanism of this class.

To this end I have provided an improved spring support for vehicle bodies having the peculiar features of construction and mode of operation set forth in the following description, the novel features of the invention being particularly pointed out and defined in the claims at the close thereof.

In the accompanying drawings:—

Figure 1 is an elevation, partly in section, of a portion of a motor propelled vehicle constructed in accordance with my invention.

Figure 2 is a section on line 2—2 of Fig. 1.

Figure 3 is a section on line 3—3 of Fig. 1.

Figure 4 is a section on line 4—4 of Fig. 1.

Figure 5 is a plan view of one of the cylinder blocks hereinafter described.

Figure 6 is an elevation, one-half in section, of one of the pistons hereinafter described.

Figure 7 is a plan view of the body member hereinafter described.

Figure 8 is a sectional view of a pair of cylinders and parts associated therewith, illustrating an alternative construction.

Having reference to the drawings, 1 represents the forward end portion of the chassis of an automobile and 2 the front axle of the latter. Upon the top of the axle 2 is seated the body member 4 of my improved spring support, said member being conveniently produced as one-piece metal casting or forging made with oppositely disposed laterally projecting arms 9, 9 each supporting a cylinder block 6 secured in position against its under side by means of screws 10. This body member 4 is secured in place upon the top of axle 2 by means of shackle bolts 22 and strap 23.

To each arm 9 is fulcrumed, as at 11, a lever arm 12, each of the latter being forked at its end adjacent axle 2 and embracing its arm 9. Each cylinder block 6 is made with two pairs of cylinder bores $6^a$ and $6^b$, the bores of each pair being connected at their lower ends by a conduit $6^c$ and filled with a liquid such as glycerine. The axis of each bore $6^a$, extended, passes at one side of the fulcrum 11 of the lever arm 12 with which it is associated, while the axis of each bore $6^b$, extended, passes at the opposite side of said fulcrum.

Within each bore $6^a$ is a piston $7^a$ to which the lower end of a connecting rod $8^a$ is pivotally connected as at 13, Fig. 6, the upper end of said rod being pivotally connected at 14 to one arm or branch of the lever arm 12 immediately above said bore $6^a$. Within each bore $6^b$ is a piston $7^b$ to which the lower end of a connecting rod $8^b$ is likewise pivotally connected, the upper end of said rod being pivotally connected at 15 to the same arm or branch of lever arm 12, but at the opposite side of the fulcrum 11 of the latter from the pivotal connection 14. It will thus be clear that when the lever arm 12 is vibrated on its fulcrum 11 the pistons $7^a$ and $7^b$ of each pair will be reciprocated in opposite directions and that the fluid referred to above will be pumped back and forth from one bore to the other of each pair through the conduit $6^c$. Also, that by regulating the capacity of this conduit $6^c$ the speed of movement of the pistons effected by any given force or power will be regulated correspondingly. The construction herein illustrated includes adjustable valve members 16 by which the capacity of each conduit is thus regulated as desired. These valve members 16 are shown as screws each mounted in a threaded hole provided in its cylinder block 6 and provided with a check nut by means of which it is fixed in adjusted position. At its inner end each screw hole referred to opens into its conduit $6^c$ and it will be clear that by adjusting the screw the capacity of its conduit may be regulated, said screw providing an adjustable constriction for the conduit.

The outer end of the lever arm 12 at one side of the axle 2 is pivotally connected at 17 to the forward end of one of the side bars of the chassis 1 while the outer end of the other lever arm 12 at the opposite side of axle 2 is connected by pivotal links 18 with said sidebar to the rear of axle 2. Thus the weight of the chassis is supported by the arms 12 and in order to counterbalance this weight I provide springs 19 within each bore $6^a$ which are incorporated in the structure under an initial compression sufficient to counterbalance a predetermined normal load when the two pivots 14 and 15 of each pair are in the same horizontal plane. I may also provide springs 20 or $20^a$ within each bore $6^b$, each of the former being arranged between its piston $7^b$ and the inner end of the bore so as to yieldingly check the rebound of the body, and the latter being each arranged above its piston $7^b$ so as to supplement the springs 19.

The upper end of each cylinder is interiorly threaded to receive a gland 30 carrying an elastic closure packing 31.

A leak tight joint is provided between each piston and the cylinder within which it is arranged by two split metal packing rings 32, one near each end of the piston, occupying annular grooves provided upon the exterior of the latter, and an intermediate packing ring or annulus 33 of compressible fibrous material occupying a third groove provided upon the exterior of the piston.

What I claim is:

1. The combination with the axle and body of a vehicle, of a pair of lever arms each pivotally connected adjacent one end to the axle and adjacent its opposite end to said body; two pairs of cylinders carried by said axle; two pairs of pistons, one in each cylinder; means connecting the pistons of each pair with one of said lever arms through which vibratory movement of the latter imparted by the body reciprocates said pistons in opposite directions; a conduit connecting the cylinders of each pair; a piston-retarding liquid occupying said cylinders and conduits, and a spring yieldingly supporting the weight of the body.

2. The combination with the axle and body of a vehicle, of the elements recited in claim 1 and including also an adjustable constriction within each of said conduits.

3. The combination with the axle and body of a vehicle, of a pair of lever arms, each pivotally connected at one end to said axle and at its opposite end to said body; a plurality of pairs of cylinders carried by said axle; pistons, one in each cylinder; means connecting the pistons of a plurality of pairs of cylinders with each of said lever arms through which vibratory movement of the latter imparted by the body reciprocates the pistons of each pair connected therewith in opposite directions; a conduit connecting the cylinders of each pair; a piston-retarding liquid occupying said cylinders and conduits, and spring means yieldingly supporting the weight of the body.

4. The combination with the axle and chassis side bar of a vehicle, of a lever arm pivotally connected at one end with said axle and at its opposite end to one end of said side bar; a second lever arm pivotally connected at one end to said axle; a pivotal link connecting the opposite end of said second lever arm with said side bar; two pairs of cylinders carried by said axle; two pairs of pistons, one for each pair of cylinders; means connecting the pistons of each pair with one of said lever arms through which vibratory movement of the latter imparted by the body reciprocates said pistons in opposite directions; a conduit connecting the cylinders of each pair; a piston-retarding liquid occupying said cylinders and conduits, and springs within some of said cylinders acting upon the pistons thereof to yieldingly support the weight of the body.

5. The combination with the axle and chassis side-bar of a vehicle, of the elemnts recited in claim 4 and including also springs arranged within some of said cylinders acting upon the pistons thereof to yieldingly oppose rebound of said body.

Signed by me at Boston, county of Suffolk and State of Massachusetts, this 3rd day of December, 1927.

EDWARD JOHN PRIME.